United States Patent
Mahoney

[11] Patent Number: 5,901,931
[45] Date of Patent: May 11, 1999

[54] RETRACTABLE SUPPORTING ARM

[76] Inventor: Thomas P. Mahoney, 5 Collins Isle, Balboa Island, Calif. 92662

[21] Appl. No.: 08/880,282
[22] Filed: Jun. 23, 1997

Related U.S. Application Data

[60] Provisional application No. 60/022,256, Jul. 22, 1996.
[51] Int. Cl.⁶ ....................................................... B62H 1/06
[52] U.S. Cl. ...................... 248/205.5; 280/304; 280/293; 242/404.2; 242/390.2; 52/108
[58] Field of Search .............................. 248/205.5, 346.1, 248/329, 330, 320; 280/293, 304, 296, 297, 298, 294; 242/404.2, 390.2; 52/108; 446/320, 478

[56] References Cited

U.S. PATENT DOCUMENTS 5,372,375  12/1994  Mahoney .................................. 280/304

Primary Examiner—Leslie A. Braun
Assistant Examiner—Long Dinh Phan
Attorney, Agent, or Firm—Thomas P. Mahoney

[57] ABSTRACT

A supporting arm includes a plurality of links coiled upon one another in retracted position in a housing. When the support arm is withdrawn from the housing, an extension means then urges the links of the arm into load-supporting position. A latch holds the arm in extended, load-bearing position. The supporting arm is shown as incorporated in a bicycle stand with the arm extended to support the bicycle.

9 Claims, 2 Drawing Sheets

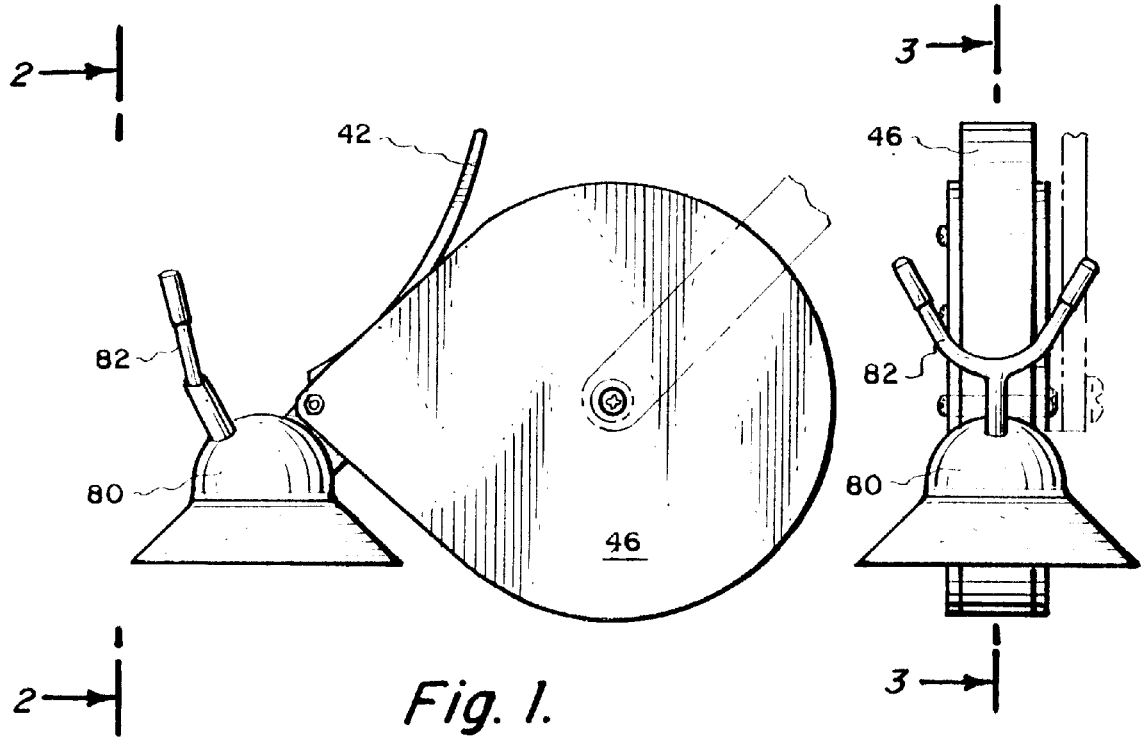
Fig. 1.
Fig. 2.
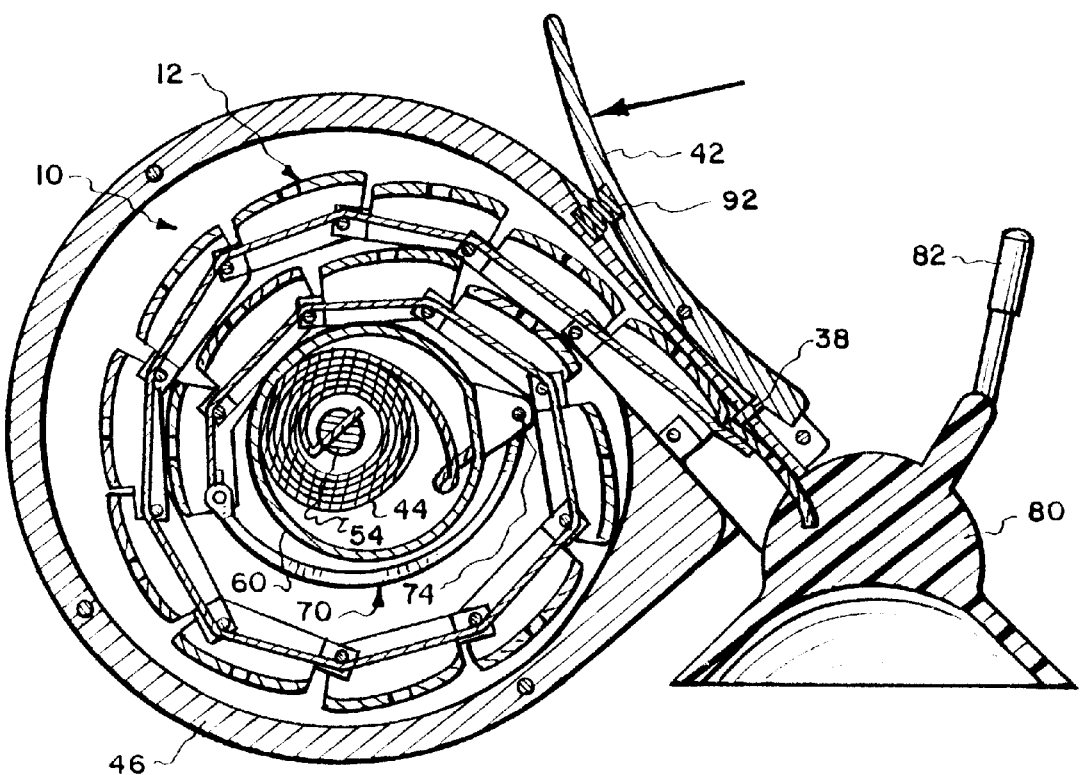
Fig. 3.

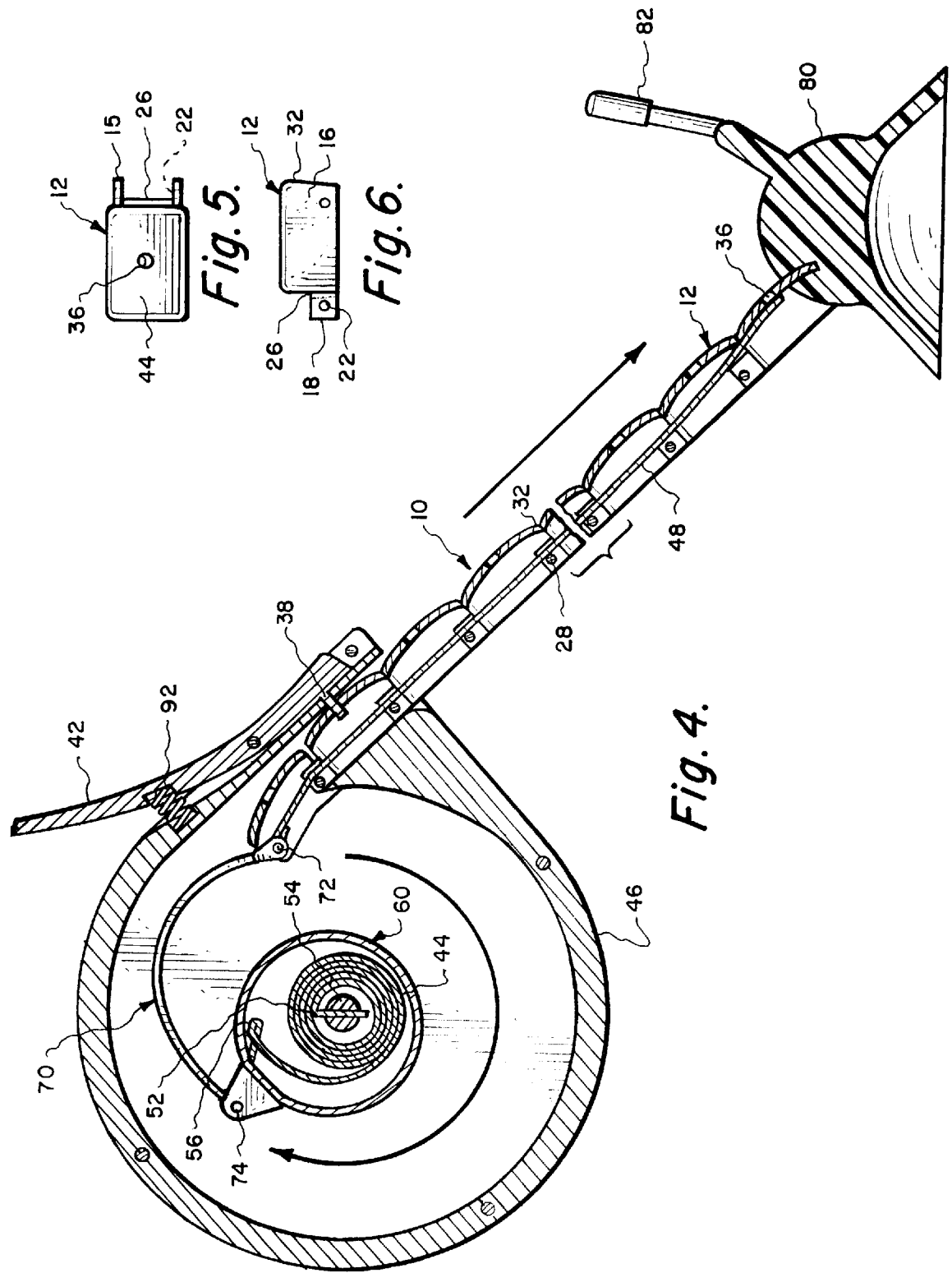

RETRACTABLE SUPPORTING ARM

This application claims the benefit of U.S. Provisional Application Ser. No. 60/022,256, filed Jul. 22, 1996.

This invention relates to an extensible, retractable supporting arm which is capable of both columnar, that is, compression, support and which resists torsional loads which might be imposed thereupon.

BACKGROUND OF THE INVENTION

The most extensively used extensible, retractable supporting arm at the present time is the well-known telescopic supporting arm which consists of a plurality of inter-nested tubular members which can be extended one from the other and maintained in extended position by internal latch means. When an extended telescopic arm is to be retracted, the latches are dislodged and the tubes collapsed one into the other.

However, when completely collapsed, there is always a lengthy tubular component which must be carried or stored.

OBJECTS AND ADVANTAGES OF THE INVENTION

A primary object of the invention is the provision of a supporting arm which is extensible, retractable and which can be extended from an associated housing to support an object with which it is associated and retracted into the housing by the simple release of the supporting arm from its extended position.

An additional object of my invention is the provision of a supporting arm which consists of a plurality of links pivotally connected to one another and having associated hinges which permit the links to be rolled or coiled one upon the other in the retracted position and extended into the operative position.

A further object of the invention is the provision of a supporting arm of the aforementioned character wherein the links have lands formed thereupon so that the adjacent links will engage the same to prevent the supporting arm from moving beyond a desired extended configuration thus preventing the collapse of the supporting arm from its supporting position.

A further object of the invention is the provision of a supporting arm of the aforementioned character which has a torsion spring associated therewith which, when the arm is extended, is loaded and which, upon release of associated latching means, will snap the supporting arm into the retracted position.

A useful application of the supporting arm of the invention is in a bicycle stand. Conventional bicycle stands are characterized by the provision of a spring-loaded rigid arm which is kicked downwardly into a supporting position and kicked upwardly into a retracted position, thus, the appellation "kick-stand".

Such stands have been widely used on bicycles for many, many years but have been found to be hazardous when applied to that variety of bicycles known as "mountain bikes". As is well known to those skilled in the art, mountain bikes are ridden at high speeds down precipitous narrow paths characterized by extreme inequality of the surfaces which are engaged by the wheels of the bike. The shock loads to which the bikes are subjected have a tendency to dislodge conventional kick-stands with frequent damage to the bike and serious injury to the rider thereof. Therefore, a bicycle stand incorporating the extensible, retractable supporting arm of the present invention is an excellent substitute for the conventional kick-stand.

A further object of my invention is the provision of a bicycle stand which incorporates a supporting arm of the aforementioned character which may be incorporated in a housing and have one end of the supporting arm connected to a torsion spring and the other end of the supporting arm connected to a ground-engaging member which can be contacted by the foot of the bicyclist to draw the supporting arm into an extended position to support the bicycle.

Another object of my invention is the provision of a bicycle stand of the aforementioned character wherein the supporting arm includes extension means adapted to extend the arm into an operative position as it is withdrawn from the associated housing. Such an extension means may be constituted by an elongated spring member located within the links of the supporting arm and serving to maintain the supporting arm in an extended, relatively straight position rather than permitting the links of the supporting arm to flop around until there is contact between the ground-engaging member and the supporting surface.

An additional object of my invention is the provision of a bicycle stand of the aforementioned character which includes latch means engagable with the extended supporting arm which, when released, permits the associated torsion spring to snap the supporting arm into the associated housing.

BRIEF DESCRIPTION OF THE DRAWINGS

Other objects and advantages of the invention will be apparent from the following specification and the accompanying drawings in which:

FIG. 1 shows a bicycle stand incorporating the supporting arm of the present invention;

FIG. 2 is a front elevational view of the bicycle stand taken from the broken line 2—2 of FIG. 1;

FIG. 3 is a vertical sectional view taken from the broken line 3—3 of FIG. 2 and showing the supporting arm of the invention retracted into the associated housing of the bicycle stand;

FIG. 4 is a view similar to FIG. 3 showing the supporting arm extended from the housing of the bicycle stand;

FIG. 5 is a top plan view of one of the links incorporated in the supporting arm; and FIG. 6 is a side elevational view of the link of FIG. 5.

DESCRIPTION OF PREFERRED EMBODIMENT

Referring to FIG. 4 of the drawings, I show a supporting arm 10 which is capable of retraction and extension as respectively shown in FIGS. 3 and 4 of the drawings. The supporting arm 10 consists of a plurality of links 12 formed from sheet metal or the like and having a top portion 14 sidewalls 16 and hinge leaves 18. The hinge leaves 18 have pin-receiving openings 22 and provide at their inner extremities a land 26 for engagement by the contacting extremity of the adjacent hinge leaf which is maintained in operative relationship by a hinge-pin 28, FIG. 4. When the supporting arm is in the extended position of FIG. 4, the adjacent extremity 32 of a hinge leaf will engage the land 26 to prevent the hinge leaf from being moved over center to collapse the support from its extended position.

The hinge leaves incorporate holes 36, one of which is slightly enlarged and has a latch pin 38 receivable therein to maintain the supporting arm 10 in extended position.

Depression of the latch handle 42 by the foot of a bicyclist will release the pin from the associated hole 26 and the associated torsion spring 44 will cause the support arm to snap back into the associated housing 46.

As the support arm 10 is drawn into its extended position, an extension leaf spring 48 extending through the support arm 10 urges the links 12 of the arm 10 into end-to-end engagement so the support arm 10 is maintained relatively straight to facilitate its extension into its load-supporting position.

The inner extremity 52 of the torsion spring 44 is connected to a stud 54 mounted in the housing and the outer extremity 56 thereof, FIG. 4, is connected to the interior of a cylindrical mandrel 60 which, in turn, is secured to the innermost link by a master link 70, said connections at 72 and 74 being pivotal. The inner extremity of the spring 48 may also be secured at the connection 72. The mandrel 60 is rotated clockwise by withdrawing the supporting arm 10 from the housing 46. This preloads the torsion spring 44.

Consequently, when the latch pin 38 is released, the torsion spring 44 will draw the supporting arm 10 into the housing 46 by rotating the mandrel 60 in a counterclockwise direction.

A ground-engaging member 80 is secured to the lower extremity of the arm 10. The shape of the member is irrelevant, but it should be such as to provide the most secure engagement of the adjacent supporting surface. Provided on the member 80 are horns 82 engagable by the foot of the bicyclist to extract the supporting arm 10 from the retracted position of FIG. 3.

Therefore, a bicyclist engages the horns 82 with his foot to extend the supporting arm 10 from the housing 46. As the supporting arm 10 is extended, the leaf spring 48 exerts a rotational force upon the adjacent links to rotate them into the straight lineal position of FIG. 4.

Conversely, when a bicyclist wishes to retract the supporting arm 12, he merely hits the latch lever 42 with his foot compressing the spring 92 and causing the latching pin 38 to be withdrawn from the associated hole 36 to permit the torsion spring to retract the supporting arm 10 and move it into the coiled position of FIG. 3.

It should be noted that the links 12 can be fabricated from any suitable material, including not only sheet metal, but synthetic plastics and the like. In any event, they are fabricated in one piece and the land 26 and hinge leaves 18 are formed integrally with each other by means of a suitable die.

Although I have described the supporting arm of the invention as incorporated in a new type of bicycle stand, it should be understood by those skilled in the art that the teachings of the invention which relate specifically to the supporting arm are applicable to a wide variety of utilization and it is not intended that the incorporation of the supporting arm in a bicycle stand be considered as a limitation on the overall scope of that aspect of the invention which relates to the supporting arm.

I claim:

1. In a bicycle stand for a bicycle having a frame, the combination of: a housing securable to said frame; an axially extensible and retractable support arm coiled upon itself in said housing for extension therefrom and retraction thereinto, said support arm having a plurality of rigid links pivotally connected to one another; extension means for said support arm to extend said support arm into a position wherein said links are engaged with one another; and ground-engaging means on the extremity of said support arm.

2. The bicycle stand of claim 1 in which said links have engagement means thereupon to maintain them in an extended, load-sustaining position.

3. The bicycle stand of claim 2 in which said support arm has spring extension means associated therewith to extend said support arm into a position wherein said engagement means of said links engage each other.

4. The bicycle stand of claim 1 in which said support arm has retraction means connected thereto for drawing said support arm into its retracted position.

5. The bicycle stand of claim 4 in which said retraction means includes a torsion spring.

6. In an extensible, retractable supporting arm, the combination of: a plurality of rigid links pivotally connected to one another, said links having engagement means thereupon to maintain them in an extended, load-bearing position; extension means for said support arm to extend said support arm into a position wherein said links are engaged with one another; and means connected to one extremity of said support arm for winding said links upon one another to retract said support arm from its load-bearing position.

7. The support arm of claim 6 in which said links have engagement surfaces upon one extremity thereof engagable by the extremity of an adjacent link to maintain the load-bearing condition of said support arm.

8. The support arm of claim 6 in which spring extension means is associated with said links to position said links in load-bearing positions as said links are extended.

9. The support arm of claim 8 in which said extension means includes retractable, elongated spring means connected to said support arm for causing movement of the links of said support arm into load-bearing position.

* * * * *